(12) United States Patent
Wu et al.

(10) Patent No.: US 12,094,142 B2
(45) Date of Patent: Sep. 17, 2024

(54) TREE HEIGHT MAPPING METHOD, DEVICE AND EQUIPMENT BASED ON ICESAT-2 HIGH-RESOLUTION DATA

(71) Applicant: WUHAN UNIVERSITY, Hubei (CN)

(72) Inventors: Zhaocong Wu, Hubei (CN); Haoyu Lin, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 0 days.

(21) Appl. No.: 18/490,742

(22) Filed: Oct. 19, 2023

(65) Prior Publication Data

US 2024/0135563 A1 Apr. 25, 2024
US 2024/0233156 A9 Jul. 11, 2024

(30) Foreign Application Priority Data

Oct. 21, 2022 (CN) .......................... 202211291609.X

(51) Int. Cl.
*G06T 3/40* (2024.01)
*G06T 7/521* (2017.01)
(Continued)

(52) U.S. Cl.
CPC ............... *G06T 7/55* (2017.01); *G06T 3/40* (2013.01); *G06T 7/521* (2017.01); *G06T 11/00* (2013.01);
(Continued)

(58) Field of Classification Search
None
See application file for complete search history.

(56) References Cited

U.S. PATENT DOCUMENTS

2020/0019856 A1* 1/2020 Kulp ...................... G06N 3/084
2023/0092122 A1* 3/2023 Kulp .................... G06N 3/0464
706/21

(Continued)

FOREIGN PATENT DOCUMENTS

CN 108921885 11/2018
CN 110221311 9/2019

(Continued)

OTHER PUBLICATIONS

Sothe et al., Spatially Continuous Mapping of Forest Canopy Height in Canada by Combining GEDI and ICESat-2 with PALSAR and Sentinel, Remote Sensing. 2022, pp. 1-19, 14(20):5158, //doi.org/10.3390/rs14205158.*

(Continued)

*Primary Examiner* — Guillermo M Rivera-Martinez
(74) *Attorney, Agent, or Firm* — JCIP GLOBAL INC.

(57) ABSTRACT

Based on ICESat-2 high-resolution data, the disclosure proposes a method for mapping tree height. The method includes acquiring ICESat-2 LiDAR data, airborne LiDAR data, Sentinel-2 imagery data, and ancillary data within the selected time and target area; preprocessing the Sentinel-2 imagery to calculate spectral feature parameters; performing photon-scale calibration on ICESat-2 LiDAR data, and combining with airborne LiDAR data for spatial-scale calibration to obtain tree height feature parameter; preprocessing the ancillary data and calculating terrain feature parameters and climate feature parameters; inputting the spectral feature parameters, terrain feature parameters, and climate feature parameters as independent variables, and the tree height feature parameter as the dependent variable into a random forest regression model to establish a forest tree height inversion model; and utilizing the forest tree height (Continued)

inversion model to generate forest tree height map at a resolution of 20 meters within the target area.

6 Claims, 4 Drawing Sheets

(51) Int. Cl.
  *G06T 7/55* (2017.01)
  *G06T 11/00* (2006.01)
(52) U.S. Cl.
  CPC ............ *G06T 2207/10028* (2013.01); *G06T 2207/10032* (2013.01); *G06T 2207/20212* (2013.01); *G06T 2207/30188* (2013.01)

(56) References Cited

U.S. PATENT DOCUMENTS

| | | | | |
|---|---|---|---|---|
| 2023/0162441 | A1* | 5/2023 | Shendryk | G06V 20/194 382/109 |
| 2023/0186503 | A1* | 6/2023 | Wu | G06V 20/13 382/199 |

FOREIGN PATENT DOCUMENTS

| | | | | | |
|---|---|---|---|---|---|
| CN | 113009502 | | 6/2021 | | |
| CN | 113204998 | A * | 8/2021 | ......... | G06K 9/00657 |
| CN | 113205475 | A * | 8/2021 | ............. | G06T 5/002 |
| CN | 113341410 | A * | 9/2021 | | |
| CN | 113360849 | A * | 9/2021 | | |
| CN | 113885012 | | 1/2022 | | |
| CN | 113885012 | A * | 1/2022 | | |
| CN | 113920438 | | 1/2022 | | |
| CN | 113960625 | | 1/2022 | | |
| CN | 113960625 | A * | 1/2022 | ............. | G01S 17/89 |
| CN | 114519823 | | 5/2022 | | |
| CN | 114693765 | A * | 7/2022 | | |
| CN | 116972814 | A * | 10/2023 | | |
| JP | 2011133451 | | 7/2011 | | |
| WO | 2002065155 | | 8/2002 | | |
| WO | 2022050109 | | 3/2022 | | |

OTHER PUBLICATIONS

Jiang et al., Mapping the Forest Canopy Height in Northern China by Synergizing ICESat-2 with Sentinel-2 Using a Stacking Algorithm. Remote Sensing. 2021, pp. 1-17, 13(8):1535, //doi.org/10.3390/rs13081535.*

Simard et al., Mapping forest canopy height globally with spaceborne lidar, 2011, J. Geophys. Res., vol. 116, G04021, pp. 1-12, doi:10.1029/2011JG001708.*

Nandy et al., Mapping forest height and aboveground biomass by integrating ICESat-2, Sentinel-1 and Sentinel-2 data using Random forest algorithm in northwest Himalayan foothills of India, 2021, Geophysical Research Letters, 48, e2021GL093799, pp. 1-10, //doi.org/10.1029/2021GL093799.*

Jiang et al., Integrating spaceborne LiDAR and Sentinel-2 images to estimate forest aboveground biomass in Northern China, Carbon Balance Manage 17, 2022, pp. 1-13, //doi.org/10.1186/s13021-022-00212-y.*

Wang et al., High-resolution mapping of forest canopy height using machine learning by coupling ICESat-2 LiDAR with Sentinel-1, Sentinel-2 and Landsat-8 data, 2020, International Journal of Applied Earth Observation and Geoinformation, vol. 92, 02163, ISSN 1569-8432, pp. 1-14, //doi.org/10.1016/j.jag.2020.102163.*

Xi et al., Forest Canopy Height Mapping by Synergizing ICESat-2, Sentinel-1, Sentinel-2 and Topographic Information Based on Machine Learning Methods, 2022, Remote Sensing. 2022; 14(2):364, pp. 1-22, //doi.org/10.3390/rs14020364.*

Jacobus et al., Crop type mapping using LiDAR, Sentinel-2 and aerial imagery with machine learning algorithms, 2020, Geo-spatial Information Science, 24:2, pp. 215-227, DOI: 10.1080/10095020.2020.1782776.*

Ghosh et al., Canopy Height Estimation Using Sentinel Series Images through Machine Learning Models in a Mangrove Forest, 2020, Remote Sensing 2020, 12(9):1519, pp. 1-21, //doi.org/10.3390/rs12091519.*

Neuenschwander et al., ATLAS/ICESat-2 L3A Land and Vegetation Height, Version 5 [Data Set], 2021, Boulder, Colorado USA. NASA National Snow and Ice Data Center Distributed Active Archive Center, pp. 1-18, //doi.org/10.5067/ATLAS/ATL08.005. Date Accessed Feb. 13, 2024.*

Emde et al., The libRadtran software package for radiative transfer calculations (version 2.0), 2015, Geosci. Model Dev. Discuss., 8, pp. 10237-10303, 2015, geosci-model-dev-discuss.net/8/10237/2015/doi:10.5194/gmdd-8-10237-2015.*

Varvia et al., How to consider the effects of time of day, beam strength, and snow cover in ICESat-2 based estimation of boreal forest biomass?, Remote Sensing of Environment, 2022, vol. 280, 2022, 113174, ISSN 0034-4257, pp. 1-10, //doi.org/10.1016/j.rse.2022.113174.*

Salas et al., Waveform LiDAR concepts and applications for potential vegetation phenology monitoring and modeling: a comprehensive review, 2021, Geo-spatial Information Science, 24:2, pp. 179-200, DOI: 10.1080/10095020.2020.1761763.*

"First Search Report of China Counterpart Application", issued on Nov. 23, 2022, with English translation thereof, p. 1-p. 5.

"Office Action of China Counterpart Application", issued on Dec. 2, 2022, with English translation thereof, p. 1-p. 20.

"Supplementary Search Report of China Counterpart Application", issued on Dec. 16, 2022, with English translation thereof, p. 1-p. 5.

Kailong Hu et al., "Forest canopy height estimation based on ICESat/GLAS data by airborne lidar," Transactions of the Chinese Society of Agricultural Engineering, vol. 33, Aug. 2017, with English translation thereof, pp. 1-16.

Hao Chen et al., "Radar Forest Height Estimation in Mountainous Terrain Using Tandem-X Coherence Data," IEEE Journal of Selected Topics in Applied Earth Observations and Remote Sensing, vol. 11, Oct. 2018, pp. 3443-3452.

* cited by examiner

TREE HEIGHT MAPPING METHOD, DEVICE AND EQUIPMENT BASED ON ICESAT-2 HIGH-RESOLUTION DATA

CROSS-REFERENCE TO RELATED APPLICATION

This application claims the priority benefit of Chinese patent application No. 202211291609.X, filed on Oct. 21, 2022. The entirety of the above-mentioned patent application is hereby incorporated by reference herein and made a part of this specification.

TECHNICAL FIELD

The disclosure relates to the field of quantitative remote sensing, and in particular to a method, device and equipment for tree height mapping based on ICESat-2 high-resolution data.

BACKGROUND

Forest canopy height refers to the height from the top of the trees to the ground or the base of the stems. As one of the most important terrestrial ecosystems, forest canopy height plays a crucial role in biomass estimation, biodiversity assessment, forest productivity, and carbon storage. Monitoring forest canopy height over large areas and multiple time periods is essential for evaluating forest disturbance conditions, as well as related deforestation and degradation, providing vital information for decision-makers.

Remote sensing technology has been widely used to obtain forest parameters, benefiting from its ability to conduct large-scale synchronous observations, long-term continuous monitoring, and provide rich information. The primary methods for acquiring tree height through remote sensing include field measurements, optical remote sensing imagery, and Light Detection and Ranging (LiDAR) utilizing laser technology. Field measurements, though time-consuming and limited to small areas, can provide accurate tree height data. Optical remote sensing imagery, however, has limitations in capturing vertical forest structural parameters due to its ability to only gather spectral information in the horizontal direction and its susceptibility to weather conditions. In contrast, LiDAR demonstrates unique penetration capabilities, enabling the capture of precise vertical structure information for trees. It is less affected by weather conditions and offers high precision. As a result, LiDAR has become the mainstream method for obtaining tree height. Nonetheless, it should be noted that LiDAR data consists of a series of discontinuous points, which prevents the capture of tree height data in densely covered or regional areas.

LiDAR encompasses three primary categories: ground-based, airborne, and spaceborne. The first two types are limited to acquiring tree height data within smaller regions and come with higher operational expenses, their applicability for extensive tree height assessment is rather limited. In comparison, spaceborne LiDAR proves to be better suited for large-scale tree height mapping endeavors. However, there have been few existing methods specifically developed for processing ICESat-2 spaceborne LiDAR data and achieving high-resolution forest tree height mapping.

SUMMARY

For the problems in the prior arts, the disclosure provides a method, apparatus, and equipment for mapping tree height, and collaboratively utilizes multi-source remote sensing data for forest tree height modeling and 20-meter resolution forest tree height mapping.

In order to solve the above technical problem, the disclosure provides the following technical solution: a method for tree height mapping based on high-resolution ICESat-2 data, which includes the following steps:

S1, obtaining ICESat-2 LiDAR data, airborne LiDAR data, Sentinel-2 imagery data, and ancillary data within the target area and specified time period;

S2, preprocessing Sentinel-2 imagery and computing spectral feature parameters;

S3, performing photon-scale calibration on ICESat-2 LiDAR data, and combining with airborne LiDAR data for spatial-scale calibration to obtain feature parameters for tree height;

S4, preprocessing the ancillary data and calculating terrain feature parameters and climate feature parameters;

S5, inputting the spectral feature parameters, terrain feature parameters, and climate feature parameters as independent variables, and the tree height feature parameter as the dependent variable into a random forest regression model to establish a forest tree height inversion model; and S6, utilizing the forest tree height inversion model to generate forest tree height map at a resolution of 20 meters within the target area.

Furthermore, the concrete implementation of S2 includes:

S2.1, performing atmospheric calibration on Sentinel-2 imagery;

S2.2, resampling the Sentinel-2 imagery to a 20-meter resolution to match the scale of ICESat-2 LiDAR data; and S2.3, if multi-temporal images of Sentinel-2 are available in the same area, conducting median synthesis, stitching images, and extracting spectral feature parameter.

Furthermore, the step of performing atmospheric calibration in S2.1 includes: utilizing the atmospheric radiative transfer model libRadtran to generate an atmospheric calibration lookup table, which contains atmospheric conditions, sun geometry information, sensor geometry information, terrain conditions, aerosol type, aerosol optical thickness, atmospheric trace gas concentrations, and surface spectral reflectance.

Furthermore, the step of image median synthesis in S2.3 includes: overlaying all Sentinel-2 images of the target area, counting pixel values of Sentinel-2 images at the same location across different time periods, wherein assuming that there are n images containing the pixel at $m^{th}$ position, the pixel values for the $i^{th}$ image, ranging from the $2^{nd}$ to $12^{th}$ band, are denoted as $X_{m\_i\_band1}$ to $X_{m\_i\_band12}$, where $2<i<n$, taking the median of these n images as the value of the pixel at the $m^{th}$ position, wherein if n equals 1, the median would be the original pixel value, such that the media synthesis of the Sentinel-2 images are obtained.

Furthermore, the step of performing photon-scale calibration on ICESat-2 LiDAR data in S3 includes: setting photon quality control parameters for filtering, so as to remove tree height data that does not meet the requirements or contains errors, wherein the photon quality control parameters are set as follows: within any grid of 20 meters, the total number of photons is greater than 140, the percentage of photons labeled as "canopy top" is greater than 5%, the energy label of photons is "strong", the time label of photons is "night", total error of photons is less than 7 meters, and the geolocation error of the central photon is less than 6.5 meters.

Furthermore, the step of performing spatial scale calibration combining with airborne LiDAR data to obtain tree height feature parameters in S3 includes: overlaying the filtered data onto the airborne LiDAR data to extract the airborne LiDAR data corresponding to the locations of ICESat-2 LiDAR data, fitting the airborne LiDAR data and the ICESat-2 LiDAR data at the 20-meter spatial scale, and correcting the ICESat-2 LiDAR data according to fitting relationship between the airborne LiDAR data and the ICESat-2 LiDAR data at the 20-meter spatial scale, so as to obtain high-reliability tree height feature parameter h_canopy_20m.

Furthermore, S4 includes:

S4.1, calculating slope and aspect data within the target area by using the 3DEP DEM data, and resampling these data to the resolution of 20 meters to extract terrain feature parameters; and S4.2, counting time range for obtaining ICESat-2 LiDAR data, Sentinel-2 imagery and airborne LiDAR data, performing time-series synthesis of climate data during the time range and projecting synthesized data onto a 20-meter grid to extract climate feature parameters.

Furthermore, the step of performing the time-series synthesis on climate data in S4.2 includes: assuming that the time range for obtaining ICESat-2 LiDAR data, Sentinel-2 imagery, and airborne LiDAR data is from $i^{th}$ month to $j^{th}$ month in 2021, the monthly average temperature is donated as $T_i$~$T_j$, and the monthly precipitation is donated as $Pre_i$~$Pre_j$, and the formulas for performing the time-series synthesis are:

$$T = \frac{\sum_{k=i}^{j} T_k}{j-i+1} \quad (1)$$

$$Pre = \sum_{k=i}^{j} Pre_k. \quad (2)$$

A device for tree height mapping based on high-resolution ICESat-2 data, applied in the aforementioned tree height mapping method based on ICESat-2 high-resolution data, includes:

Data Acquisition Module, configured to acquire ICES at-2 LiDAR altimetry data, airborne LiDAR scanning data, Sentinel-2 imagery data, and ancillary data for a target area and specified time period;

Sentinel-2 Imagery Preprocessing Module, configured to perform preprocessing on Sentinel-2 imagery data and calculate spectral feature parameters;

Photon-scale and Spatial-scale Calibration Module, configured to perform photon-scale calibration on ICESat-2 LiDAR data and combine with airborne LiDAR data for spatial-scale calibration, obtaining tree height feature parameter;

Ancillary Data Preprocessing Module, configured to preprocess ancillary data, calculate terrain feature parameters and climate feature parameters;

Construction Module for Forest Tree Height Inversion Model: inputs spectral feature parameters, terrain feature parameters, and climate feature parameters as independent variables, and tree height feature parameter as the dependent variable into a random forest regression model to establish a forest tree height inversion model;

Forest Tree Height Map Generation Module, configured to generate a 20-meter resolution forest tree height map within the target area by using the forest tree height inversion model.

An equipment comprising a processor and a memory for storing computer programs executable on the processor, wherein the processor is configured to, when executing the computer programs, execute the steps of the method for tree height mapping based on ICESat-2 high-resolution data.

Compared with the prior arts, the disclosure has the following beneficial effects:

(1) The tree height mapping method, device, and equipment based on ICESat-2 high-resolution data provided in this disclosure, have designed a processing method at the photon and spatial scales, which eliminates laser point data with quality problems and correcting the tree height data, such that the expressiveness and accuracy of the extracted ICESat-2 LiDAR tree height data were improved.

(2) The tree height mapping method, device, and equipment based on ICES at-2 high-resolution data provided in this disclosure, incorporate multiple sources such as optical remote sensing imagery, satellite-based laser altimetry data, airborne laser scanning data, DEM data, meteorological data, and land cover data, achieving synergistic inversion between multi-source remote sensing data and LiDAR data, reducing errors caused by differences between data sources.

(3) The tree height mapping method, device, and equipment based on ICESat-2 high-resolution data provided in this disclosure, leverage the advantages of ICESat-2 high-resolution data with accurate vertical information and optical remote sensing data with dense horizontal coverage, achieving large-scale, dense coverage, and 20-meter high-resolution mapping of forest canopy height.

DETAILED DESCRIPTIONS OF THE EMBODIMENTS

The technical solution of the embodiments of the disclosure will be fully and clearly described in combination with the embodiments of the disclosure.

Figure 1:
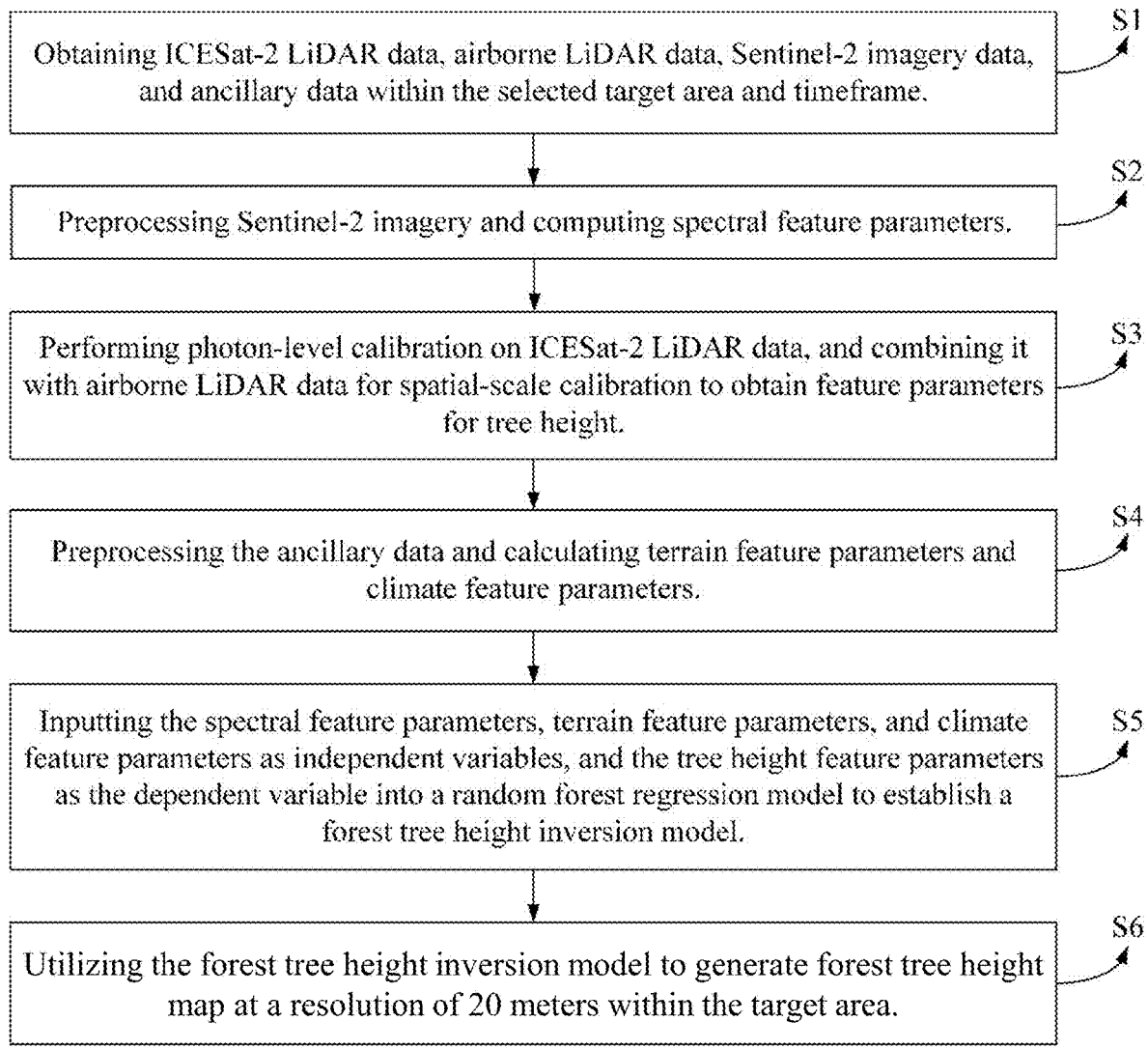
FIG. 1 is a flowchart illustrating a method for tree height mapping based on ICESat-2 high-resolution data.
Figure 2:
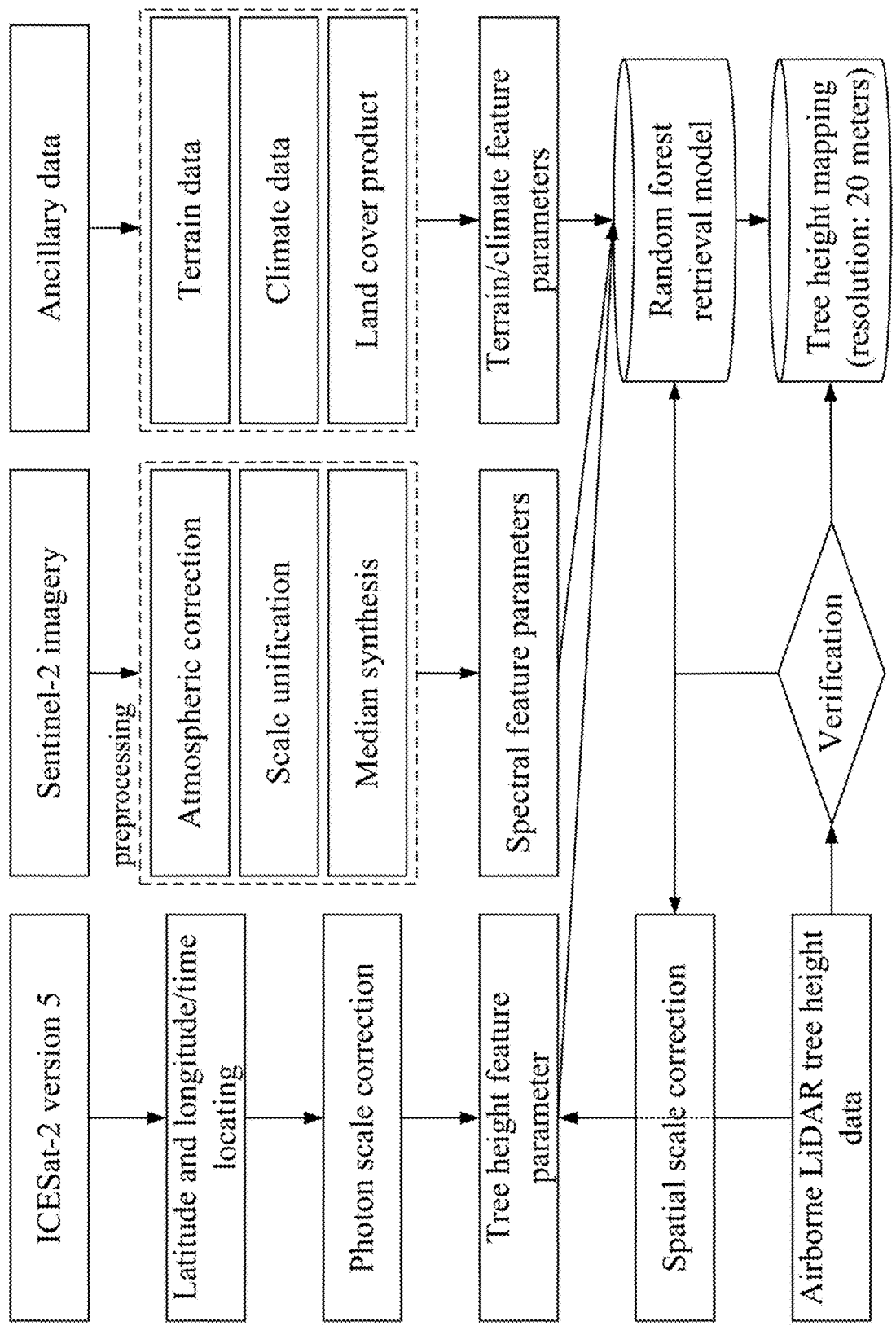
FIG. 2 is a schematic diagram illustrating the method for tree height mapping based on ICES at-2 high-resolution data.

The tree height mapping method based on ICESat-2 high-resolution LiDAR data proposed in this disclosure, as shown in FIG. 1 and FIG. 2, comprises the following steps:

S1, obtaining ICESat-2 LiDAR data, airborne LiDAR data, Sentinel-2 imagery data, and ancillary data within the target area and specified time period.

By following S1, ensuring that the consistency of the scope and timing for obtaining multi-source remote sensing data.

S2, preprocessing Sentinel-2 imagery and computing spectral feature parameters. By following S2, preprocessing optical remote sensing imagery to eliminate errors caused by geometric and atmospheric influences.

S3, performing photon-scale calibration on ICESat-2 LiDAR data, and combining with airborne LiDAR data for spatial-scale calibration to obtain feature parameters for tree height.

By following S3, filtering and calibrating spaceborne LiDAR data, filtering out data with significant errors in LiDAR and correcting the overall error in LiDAR tree height.

S4, preprocessing the ancillary data and calculating terrain feature parameters and climate feature parameters.

By following S4, integrating ancillary data into the coordinate system and resolution of the aforementioned optical and LiDAR data to eliminate errors caused by differences in data sources.

S5, inputting the spectral feature parameters, terrain feature parameters, and climate feature parameters as independent variables, and the tree height feature parameter as the dependent variable into a random forest regression model to establish a forest tree height inversion model.

By following S5, the advantages of continuous coverage from optical remote sensing data and high-precision vertical structural information from LiDAR data are comprehensively utilized to establish the tree height inversion model.

S6, utilizing the forest tree height inversion model to generate forest tree height map at a resolution of 20 meters within the target area.

By following S6, achieving high-resolution and continuous dense-cover forest tree height mapping in the target area.

The tree height mapping method based on high-resolution ICES at-2 data provided in this disclosure designs a processing method at photon and spatial scales to eliminate LiDAR point data with quality issues and correct the tree height data, thereby improving the expression ability and accuracy of the extracted tree height data derived from ICESat-2.

The tree height mapping method based on high-resolution ICES at-2 data provided in this disclosure, combined with multiple sources referring to optical remote sensing imagery, spaceborne LiDAR data, airborne LiDAR data, DEM data, meteorological data, and land cover data, achieves collaborative inversion between multi-source remote sensing data and LiDAR data, and reduces errors caused by differences between data sources.

The tree height mapping method based on high-resolution ICESat-2 data provided in this disclosure comprehensively utilizes the advantages of ICES at-2 LiDAR data's high-resolution and high-precision vertical information, along with the horizontal dense coverage of optical remote sensing data, to achieve large-scale, dense coverage, and 20-meter high-resolution forest canopy height mapping.

The ICESat-2 satellite launched by NASA in September 2018 is equipped with a small footprint LiDAR device called Advanced Topographic Laser Altimeter System (AT-LAS). The latest data product version 5 was released in January 2021, with a resolution of approximately 20 meters, which can be combined with high-resolution optical remote sensing data Sentinel-2 to achieve forest height inversion and tree height mapping at a resolution of 20 meters.

Therefore, in the embodiment of the disclosure, obtaining ICES at-2 LiDAR data, airborne LiDAR data, Sentinel-2 imagery data, and ancillary data within the target area and specified time period.

In specific, S1 includes: S1.1, obtaining the latitude and longitude range of the target area; S1.2, obtaining airborne LiDAR data of the target area; S1.3, retrieving Sentinel-2 images covering the target area, along with their imaging timestamp; S1.4, gathering ICESat-2 LiDAR (e.g., ICESat-2 version 5 LiDAR) data with data publication timestamp being the same year as Sentinel-2 images's in the latitude and longitude range of the target area; and S1.5, obtaining, ancillary data covering the target area, including 3DEP DEM, slope, aspect, precipitation, average temperature, and land cover products.

In the embodiment of the disclosure, the data source is from ICESat-2 version 5. Therefore, the timestamps of Sentinel-2 images within the target area should be after January 2021 (ICESat-2 version5 data was released starting in January 2021); gathering ICESat-2 LiDAR version data for the target area's latitude and longitude range, with data publication timestamp within the same year as Sentinel-2 images.

In specific, S2 includes: S2.1, performing atmospheric calibration on the Sentinel-2 images; S2.2, resampling the Sentinel-2 images to a spatial resolution of 20 meters by using scale of ICESat-2 LiDAR data as a reference; and S2.3, if multiple Sentinel-2 images from different time periods are available for the same area, performing a median synthesis of the images and finally, stitching the images together and extracting spectral feature parameters.

In this embodiment of the disclosure, because the data is sourced from ICESat-2 version 5, in S2.2, the Sentinel-2 images are resampled to a spatial resolution of 20 meters by using the scale of the ICESat-2 LiDAR data as a reference.

The step of performing atmospheric calibration in S2.1 includes: utilizing the libRadtran atmospheric radiative transfer model to generate a lookup table for atmospheric calibration. This lookup table contains information about atmospheric conditions, solar geometry, sensor geometry, terrain conditions, aerosol type, aerosol optical thickness, atmospheric trace gas content, and surface reflectance spectra. The original Sentinel-2 images are inputted into this lookup table to obtain the Sentinel-2surface reflectance images.

The step of performing median synthesis of the images in S2.3 includes: overlaying all S2 images in the target area, and conducting statistics about the pixel values of Sentinel-2 images at the same location across different time periods. Assuming that there are n images containing the pixel at $m^{th}$ position, the pixel values for the $i^{th}$ image, ranging from the $2^{nd}$ to $12^{th}$ band, are denoted as $X_{m\_i\_band1}$ to $X_{m\_i\_band12}$, where $2 \leq i \leq n$. Taking the median of these n images, as the value of the pixel at the mth position. If n equals 1, the median value would be the original pixel value, so as to obtain the media synthesis of the Sentinel-2 images.

The spectral feature parameters calculated in S2.3 are shown in Table 1.

TABLE 1

Summary of spectral feature parameters.

| Types | Feature Parameter Names | Numbers |
| --- | --- | --- |
| Band Reflectance | Band2-Band12 | 11 |
| Spectral Index | Normalized Difference Vegetation Index (NDVI, NDVI8a4, NDVI8a5, NDVI8a6, NDVI8a7, NDVI85, NDVI86, NDVI87, REndvi_a, REndvi_b), Atmospherically Resistant Vegetation Index (ARVI), Chlorophyll Vegetation Index (CVI), Red-edge | 25 |

TABLE 1-continued

Summary of spectral feature parameters.

| Types | Feature Parameter Names | Numbers |
|---|---|---|
| | Chlorophyll Index (RECI), Difference Vegetation Index (DVI), Enhanced Vegetation Index (EVI), Green Difference Vegetation Index (GDVI), Green Normalized Difference Vegetation Index (GNDVI), Green Soil Adjusted Vegetation Index (GSAVI), Modified Soil Adjusted Vegetation Index (MSAVI), Normalized Difference Green Index (NDGI), Ratio Vegetation Index (RVI), Soil Adjusted Vegetation Index (SAVI), Specific Leaf Area Index (SLAI), Visible Atmospherically Resistant Index (VARI), Fractional Vegetation Cover (FVC). | |
| Tasseled Cap Transformation | Tasseled Cap Transformation Brightness (TCT_BI), Tasseled Cap Transformation Greenness (TCT_G), Tasseled Cap Transformation Wetness (TCT_WI) | 3 |
| Texture Features | Mean (NDVI_mean), variance (NDVI_var), homogeneity (NDVI_homo), contrast (NDVI_con), dissimilarity (NDVI_dis), entropy (NDVI_ent), second moment(NDVI_sec), correlation (NDVI_cor). | 8 |
| Total | | 47 |

In specific, S3 includes: S3.1, processing the ICESat-2 LiDAR data at the photon level and removing tree height data with errors by setting photon quality control parameters for filtering; S3.2, combining with airborne LiDAR data to spatially correct the ICESat-2 LiDAR data and extracting tree height feature parameter.

The step of performing photon-scale calibration of ICESat-2 LiDAR data includes: S3.11, setting photon quality control parameters for filtering and removing tree height data that does not meet the requirements or contains errors.S3.12, the total number of photons in a 20-meter grid is greater than 140; S3.13, the percentage of photons labeled as "canopy top" in a 20-meter grid is greater than 5%; S3.14, the energy label of photons in a 20-meter grid is "strong"; S3.15, the time label of photons in a 20-meter grid is "night"; S3.16, the total error of photons in a 20-meter grid is less than 7 meters; and S3.17, the geolocation error of the central photon in a 20-meter grid is less than 6.5 meters.

The step of performing, by using airborne LiDAR data, spatial-scale calibration to extract tree height feature parameter in S3.2 includes: S3.21, overlaying the filtered ICESat-2 data onto the airborne LiDAR data; S3.22, extracting the airborne LiDAR data at positions corresponding to ICESat-2 LiDAR data and fitting these two types of data at a 20-meter spatial resolution; S3.23, based on the fitting relationship between ICESat-2 LiDAR data and airborne LiDAR data, correcting the ICESat-2 LiDAR data to obtain reliable tree height feature parameter h_canopy_20m.

Figure 3:
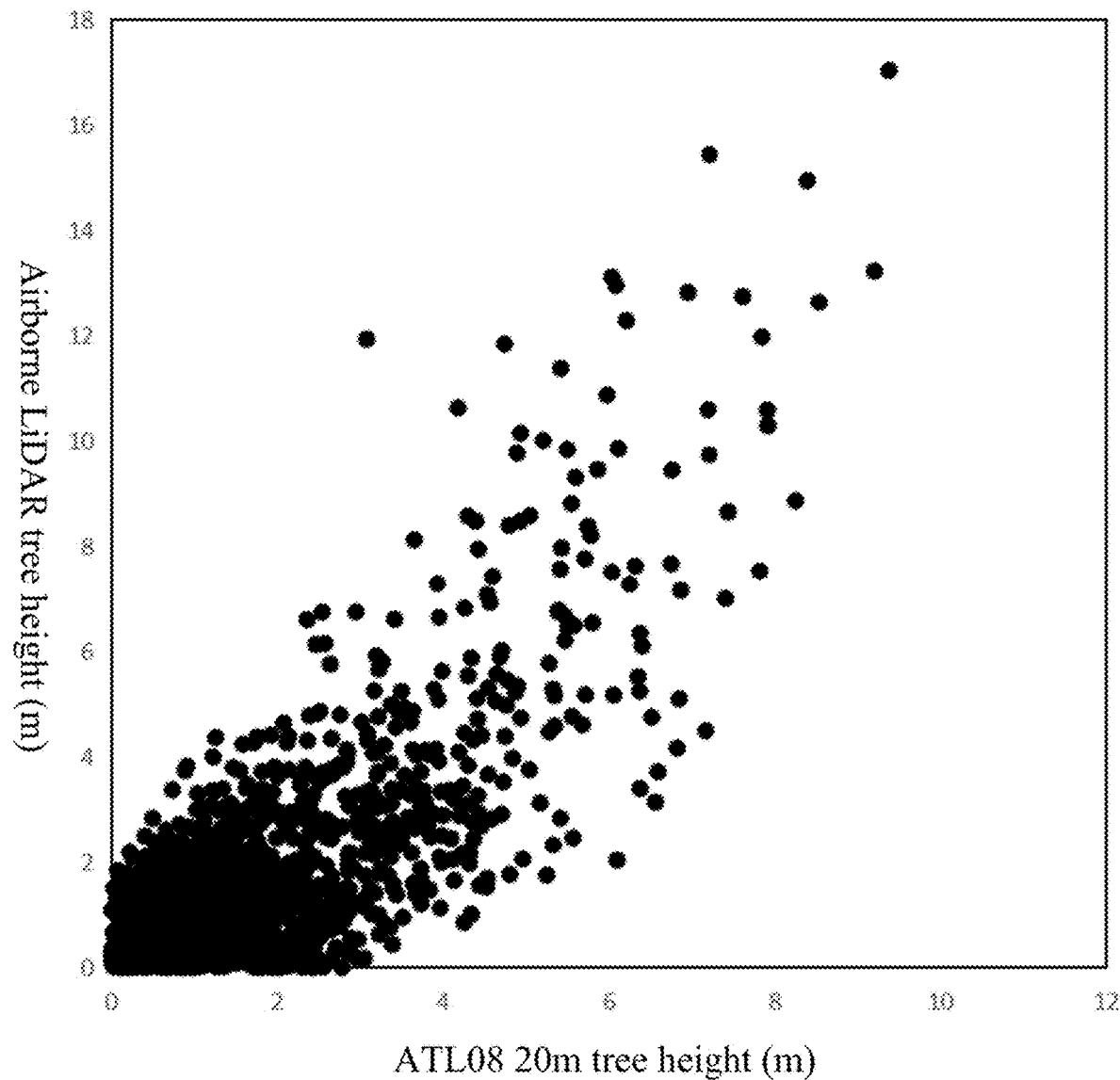
FIG. 3 is a scatter plot illustrating tree height data of ICESat-2 version 5 data after performing photon and spatial calibration and the tree height measurements obtained from airborne LiDAR.

As shown in FIG. 3, it illustrates a scatter plot, obtained by ICESat-2 version 5 after photon-scale and spatial-scale calibration, of tree height data and airborne LiDAR. By S3, the LiDAR data with quality issues were firstly filtered at photon, and then the ICESat-2 LiDAR data were further corrected at the spatial scale by combining tree height data derived from airborne LiDAR data on the spot. These calibrations have effectively improved the accuracy of ICESat-2 LiDAR tree height data and enhanced its representation ability in specific areas.

In specific, S4 includes: S4.1, utilizing 3DEP DEM data to calculate slope and aspect data within the target area and resampled these data to 20 meters to extract terrain feature parameters; and S4.2 counting time range for obtaining ICESat-2 LiDAR data, Sentinel-2 imagery and airborne LiDAR data, performing time-series synthesis of climate data during the time range and projecting synthesized data onto a 20-meter grid to extract climate feature parameters.

In S4.2, the step of performing time-series synthesis of climate data includes: assuming that the time range for obtaining ICESat-2 LiDAR data, Sentinel-2 imagery, and airborne LiDAR data is from $i^{th}$ month to $j^{th}$ month in 2021, the monthly average temperature is donated as Ti~Tj, and the monthly precipitation is donated as Prei~Prej, the formulas for performing time-series synthesis are:

$$T = \frac{\sum_{k=i}^{j} T_k}{j - i + 1} \tag{1}$$

$$Pre = \sum_{k=i}^{j} Pre_k. \tag{2}$$

The specific extraction of terrain and climate feature parameters can be found in Table 2.

TABLE 2

Summary of terrain and climate feature parameters.

| Types | Feature Parameter Names | Numbers |
|---|---|---|
| Terrain Feature | Elevation (digital elevation model, DEM) Slope Aspect | 3 |
| Climate Feature | Temperature (T) Precipitation (Pre) | 2 |
| Total | | 5 |

In specific, S5 includes: overlaying ICESat-2 LiDAR data, Sentinel-2 imagery, calculated spectral feature parameters, ancillary data, calculated terrain feature parameters, and climate feature parameters in the same coordinate system to extract tree height samples from ICESat-2 LiDAR data spot locations. The dependent variable is the tree height, and the independent variables are spectral feature parameters, terrain feature parameters, and climate feature parameters corresponding to each tree height sample. The samples are randomly divided into 80% for training data and 20% for validation data, and then input into a random forest regression model. The random forest regression model is trained, and parameters are optimized and validated in order to obtain the forest tree height inversion model.

In this embodiment of the disclosure, the ICES at-2 LiDAR data, Sentinel-2 imagery, and the spectral feature parameters calculated in S2, along with the ancillary data, and the terrain and climate feature parameters calculated in S4, are overlaid in the same coordinate system to extract tree height samples on the footprint locations of the ICES at-2 LiDAR data.

In specific, S6 includes: The selected feature parameters, terrain feature parameters, and climate feature parameters within the target region where no LiDAR points are covered were into the forest tree height inversion model to output the tree height within the target region where no LiDAR points are cover, resulting in a high-resolution and densely covered tree height distribution map of the target region at a resolution of 20 meters.

The resolution tree maps produced by existing methods and data all greater than 30 m. This disclosure provides a tree height mapping method, device, and equipment based on high-resolution ICESat-2 data, by which spatial resolution of forest tree height maps can be improved by producing 20-meter resolution forest tree height maps for the first time by combining multi-source remote sensing data with a resolution higher than 20 meters. This disclosure also introduces a novel method for processing the new ICESat-2 lidar high-resolution tree height data and the joint inversion of multi-source remote sensing data. By utilizing the information and advantages of multiple sources of remote sensing data, the accuracy and representativeness of the produced tree height map are improved to some extent.

Figure 4:
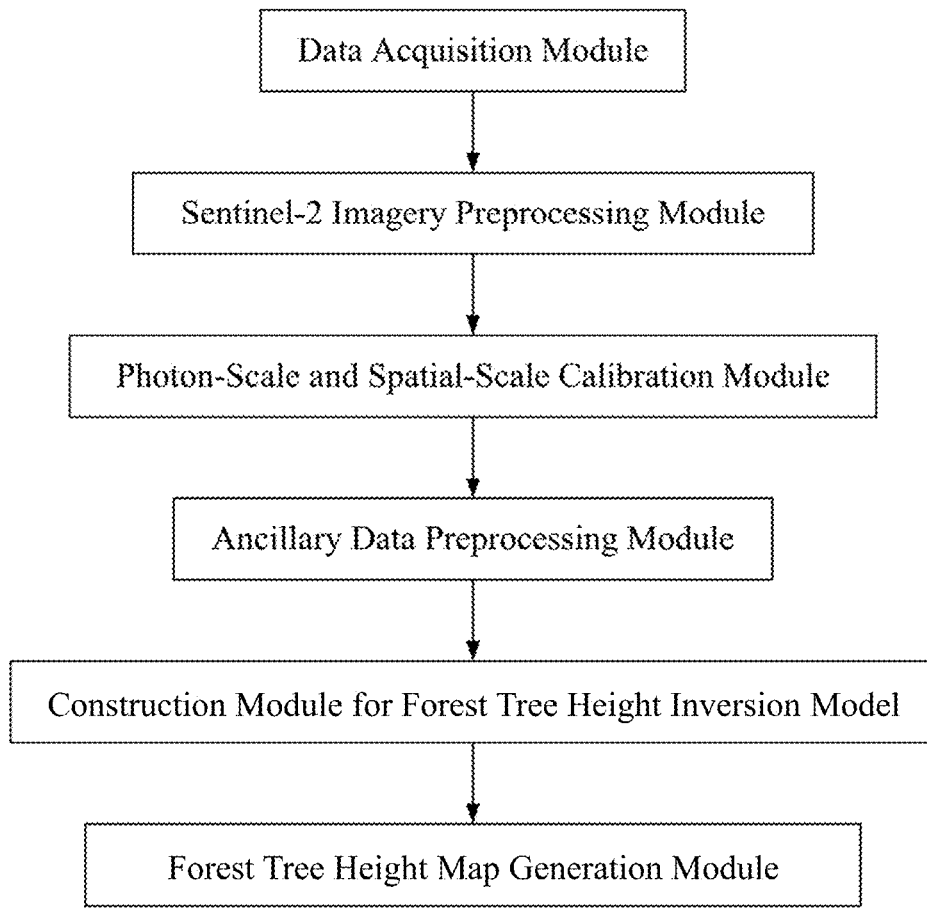
FIG. 4 is a schematic diagram illustrating a device for tree height mapping based on ICES at-2 high-resolution data.

In addition, this disclosure also provides a tree height mapping device based on high-resolution ICESat-2 data, as shown in FIG. 4, which is applied in conjunction with the tree height mapping method based on ICESat-2 data. This device includes modules as below.

Data Acquisition Module, configured to acquire ICESat-2 laser altimetry data, airborne laser scanning data, Sentinel-2 imagery data, and auxiliary data for a target area and specified time period.

Sentinel-2 Imagery Preprocessing Module, configured to perform preprocessing on Sentinel-2 imagery data and calculate spectral feature parameters.

Photon-Scale and Spatial-Scale Calibration Module, configured to perform photon-scale calibration on ICESat-2 LiDAR data and combine with airborne LiDAR data for spatial-scale calibration, obtaining tree height feature parameter.

Ancillary Data Preprocessing Module, configured to preprocess ancillary data, calculate terrain feature parameters and climate feature parameters.

Construction Module for Forest Tree Height Inversion Model: inputs spectral feature parameters, terrain feature parameters, and climate feature parameters as independent variables, and tree height feature parameter as the dependent variable into a random forest regression model to establish a forest tree height inversion model.

Forest Tree Height Map Generation Module, configured to generate a 20-meter resolution forest tree height map within the target area by using the forest tree height inversion model.

This disclosure also provides an equipment comprising a processor and a memory for storing computer programs executable on the processor, wherein the processor is configured to, when executing the computer programs, execute the steps of the method for tree height mapping based on ICESat-2 high-resolution data.

The memory in the embodiments of this disclosure is used to store various types of data to support the operation on the equipment provided by this disclosure. Examples of these data include any computer program used to operate the equipment provided by this disclosure.

The tree height mapping method based on high-resolution ICESat-2 data disclosed in the embodiments of this disclosure can be implemented in or achieved by the processor. The processor may be an integrated circuit chip with signal processing capabilities. In the implementation process, each step of the tree height mapping method based on high-resolution ICES at-2 data can be accomplished through integrated logical circuits of hardware in the processor or in the form of software instructions. The aforementioned processor can be a general-purpose processor, a digital signal processor (DSP), or other programmable logic devices, discrete gates, or transistor logic devices, discrete hardware components, etc. The processor can implement or execute the disclosed methods, steps, and logical diagrams in the embodiments of this disclosure. The general-purpose processor can be a microprocessor or any conventional processor, and the steps of the disclosed methods in conjunction with the embodiments of this disclosure can be directly embodied by a hardware decoding processor or by a combination of hardware and software modules in the decoding processor. The software modules can be located in a storage medium, which is located in a memory, and the processor reads the information in the memory and combines it with its hardware to complete the steps of the tree height mapping method based on high-resolution ICES at-2 data provided in the embodiments of this disclosure.

In exemplary embodiments, the devices provided by this disclosure can be implemented by one or more Application Specific Integrated Circuits (ASICs), DSPs, Programmable Logic Devices (PLDs), Complex Programmable Logic Devices (CPLDs), FPGAs, general-purpose processors, controllers, microcontroller units (MCUs), microprocessors, or other electronic components to perform the aforementioned methods.

In one exemplary application, the devices provided by this disclosure include laptop computers, which are used to run computer programs and implement the tree height mapping method based on high-resolution ICESat-2 data as disclosed in any of the aforementioned embodiments.

The memory can be considered volatile memory or non-volatile memory, or it can include both volatile and non-volatile memory. The non-volatile memory can be a Read-Only Memory (ROM), Programmable Read-Only Memory (PROM), Erasable Programmable Read-Only Memory (EPROM), Electrically Erasable Programmable Read-Only Memory (EEPROM), Ferromagnetic Random Access Memory (FRAM), Flash Memory, magnetic surface storage, optical discs, or Compact Disc Read-Only Memory (CD-ROM); magnetic surface storage can be disk storage or tape storage. Volatile memory can be Random Access Memory (RAM), which is used as external cache. Many forms of RAM can be used, such as Static Random Access Memory (SRAM), Synchronous Static Random Access Memory (SSRAM), Dynamic Random Access Memory (DRAM), Synchronous Dynamic Random Access Memory (SDRAM), Double Data Rate Synchronous Dynamic Random Access Memory (DDRSDRAM), Enhanced Synchronous Dynamic Random Access Memory (ESDRAM), SyncLink Dynamic Random Access Memory (SLDRAM), and Direct Rambus Random Access Memory (DRRAM). The memory described in the embodiments of this disclosure is intended to include these and any other suitable types of memory.

In exemplary embodiments, this disclosure also provides a storage medium, specifically a computer-readable storage medium, which includes memory storing computer programs. The aforementioned computer programs can be executed by the processor of the device provided by this disclosure to perform the steps of the methods disclosed in the embodiments of this disclosure. The computer-readable storage medium can include ROM, PROM, EPROM, EEPROM, Flash Memory, magnetic surface storage, optical discs, or CD-ROM, among other storage media.

Furthermore, it is to be noted that in case of no conflicts, the embodiments and the features of the embodiments of the disclosure can be mutually combined.

Apparently, those skilled in the art can make various modifications and variations to this disclosure without departing from the spirit and scope of this disclosure. Accordingly, if these modifications and variations of this disclosure fall within the scope of the claims and their equivalents, this disclosure also intends to encompass these modifications and variations.

What is claimed is:

1. A method for tree height mapping based on high-resolution ICESat-2 data, the method comprising:
    S1, obtaining ICESat-2 version 5 light detection and ranging (LiDAR) data, airborne LiDAR data, Sentinel-2 imagery data, and ancillary data within a target area and a target specified time period, wherein the ancillary data comprising at least one of following information: three-dimensional Elevation Program (3DEP) digital elevation model (DEM), slope, aspect, precipitation, average temperature, and land cover products corresponding to the target area;
    S2, preprocessing the Sentinel-2 imagery data and computing spectral feature parameters of the Sentinel-2 imagery data, comprising following steps S2.1 to S2.3:
    S2.1, performing atmospheric calibration on the Sentinel-2 imagery data;
    S2.2, resampling the Sentinel-2 imagery data to a 20-meter resolution to match scale of the ICESat-2 version 5 LiDAR data;
    S2.3, if multiple images corresponding to different time periods of the Sentinel-2 imagery data are available in the target area,
    conducting image median synthesis, image stitching, and spectral feature parameter extraction on the multiple images of the Sentinel-2 imagery data, wherein the spectral feature parameters of the multiple images are including band reflectance, spectral indices, texture features and tasseled cap transformation,
    wherein the image median synthesis comprising:
    overlaying all the multiple images of the Sentinel-2 imagery data of the target area, identifying pixel values of the multiple images at a same location across different time periods, wherein if n images each containing pixels at m positions of the multiple images of the Sentinel-2 imagery data, pixel values for ith image among the n images, ranging from 2nd to 12th band, are denoted as Xm_i_band1 to Xm_i_band12, where $2 \leq i \leq n$,
    taking the median of these n images, as the value of pixel at mth position, wherein if n equals 1, the median value would be is original pixel value, so as to obtain median synthesis Sentinel-2 imagery;
    S3, performing photon-scale calibration on the ICESat-2 version 5 LiDAR data to obtain filtered ICESat-2 version 5 LIDAR data, and combining with the airborne LiDAR data for spatial-scale calibration, overlaying filtered ICESat-2 version 5 LiDAR data onto the airborne LiDAR data to extract the airborne LiDAR data corresponding to locations of the ICESat-2 version 5 LiDAR data, fitting the airborne LiDAR data and the ICESat-2 version 5 LiDAR data at 20-meter spatial scale, and correcting the ICESat-2 version 5 LIDAR data according to fitting relationship between the airborne LiDAR data and the ICESat-2 version 5 LiDAR data at the 20-meter spatial scale, so as to obtain high-reliability tree height feature parameter h_canopy_20m;
    S4, preprocessing the ancillary data and calculating terrain feature parameters and climate feature parameters;
    S5, inputting the spectral feature parameters, the terrain feature parameters, and the climate feature parameters as independent variables, and the tree height feature parameter as dependent variable into a random forest regression model to establish a forest tree height inversion model; and
    S6, utilizing the forest tree height inversion model to generate forest tree height map at a resolution of 20 meters within the target area.

2. The method of claim 1, wherein S2.1 comprises:
    performing atmospheric calibration on Sentinel-2 imagery comprises: utilizing atmospheric radiative transfer model libRadtran to generate an atmospheric calibration lookup table, which contains atmospheric conditions, sun geometry information, sensor geometry information, terrain conditions, aerosol type, aerosol optical thickness, atmospheric trace gas concentrations, and surface spectral reflectance.

3. The method of claim 1, wherein S3 comprises:
    performing photon-scale calibration on the ICESat-2 version 5 LiDAR data comprises:
    setting photon quality control parameters for filtering to remove tree height data that does not meet requirements or contains errors from the ICESat-2 version 5 LiDAR data,
    wherein the photon quality control parameters are set as follows:
    within any grid of 20 meters,
    total number of photons is greater than 140,
    percentage of photons labeled as canopy top is greater than 5%,
    energy label of photons is strong,
    time label of photons is night,
    total error of photons is less than 7 meters, and
    geolocation error of central photon is less than 6.5 meters.

4. The method of claim 1, wherein S4 comprises the following steps:
    S4.1, calculating slope and aspect data within the target area by using the 3DEP DEM data, and resampling the slope and aspect data to the resolution of 20 meters to extract the terrain feature parameters;
    S4.2, counting time range for obtaining the ICESat-2 version 5 LiDAR data, the Sentinel-2 imagery data and the airborne LiDAR data, performing time-series synthesis of climate data during the time range and projecting synthesized data onto a 20-meter grid to extract the climate feature parameters.

5. The method of claim 4, wherein S4.2 comprises:
    performing the time-series synthesis of the climate data comprises: if the time range for obtaining the ICESat-2 version 5 LiDAR data, the Sentinel-2 imagery data, and the airborne LiDAR data is from i$^{th}$ month to j$^{th}$ month, monthly average temperature is donated as Ti~Tj, and monthly precipitation is donated as Prei~Prej, formulas for performing the time-series synthesis are:

$$T = \frac{\sum_{k=i}^{j} T_k}{j - i + 1} \quad (1)$$

$$Pre = \sum_{k=i}^{j} Pre_k. \quad (2)$$

wherein i is an order of the first one month of the time range, j is an order of the last one month of the time range, $T_k$ is average temperature of k$^{th}$ month among the time range, $Pre_k$ is average precipitation of k$^{th}$ month among the time range, T is average temperature of the time range, and Pre is average precipitation of the time range.

6. A device for tree height mapping based on high-resolution ICESat-2 data, configured for applying method for tree height mapping based on high-resolution ICESat-2 data of claim 1, comprising a processor; and A memory, configured to store computer programs, wherein the processor executes the computer programs to:

to obtain the ICESat-2 version 5 LiDAR data, the airborne LiDAR data, the Sentinel-2 imagery data, and the ancillary data within the target area and the target time period;

the processor executes the computer programs to preprocess the Sentinel-2 imagery data and calculate spectral feature parameters, comprising:

performing atmospheric calibration on the Sentinel-2 imagery data; and resampling the Sentinel-2 imagery data to 20m based on scale of the ICESat-2 version 5 LiDAR data, wherein if multiple mages corresponding to different time periods are available in the area, conducting image median synthesis, image stitching, and spectral feature parameter extraction on the multiple images of the Sentinel-2 imagery data, wherein the spectral feature parameters of the Sentinel-2 imagery data are including band reflectance, spectral indices, texture features and tasseled cap transformation, wherein the image median synthesis comprising:

overlaying all the multiple images of the Sentinel-2 imagery data of the target area, identifying pixel values of the multiple images at a same location across different time periods, wherein if n images each containing pixels at m positions of the multiple images of the Sentinel-2 imagery data, pixel values for the ith image among the n images, ranging from 2nd to 12th band, are denoted as Xm_i_band1 to Xm_i_band12, where 2≤i≤n, taking the median of these n images, as the value of pixel at mth position, wherein if n equals 1, the median value is original pixel value, such that media synthesis the multiple images of the Sentinel-2 data is obtained;

the processor executes the computer programs to perform photon-scale calibration on the ICESat-2 version 5 LiDAR to obtain filtered ICESat-2 version 5 LiDAR data and combine with the airborne LiDAR data for spatial-scale calibration, overlaying the filtered ICESat-2 version 5 LiDAR data onto the airborne LiDAR data to extract the airborne LiDAR data corresponding to locations of the ICESat-2 version 5 LiDAR data, fitting the airborne LiDAR data and the ICESat-2 version 5 LiDAR data at 20-meter spatial scale, and correcting the ICESat-2 version 5 LiDAR data according to fitting relationship between the airborne LiDAR data and the ICESat-2 version 5 LiDAR data at the 20-meter spatial scale, so as to obtain high-reliability tree height feature parameter h_canopy_20m;

the processor executes the computer programs to preprocess ancillary data, calculate terrain feature parameters and climate feature parameters;

the processor executes the computer programs to input spectral feature parameters, terrain feature parameters, and climate feature parameters as independent variables, and tree height feature parameter as dependent variable into a random forest regression model to establish a forest tree height inversion model; and he processor executes the computer programs to generate a 20-meter resolution forest tree height map within the target area by using the forest tree height inversion model.

* * * * *